US009430801B2

(12) United States Patent
Bhatt

(10) Patent No.: US 9,430,801 B2
(45) Date of Patent: Aug. 30, 2016

(54) METHODS SYSTEMS AND COMPUTER PROGRAM PRODUCTS FOR GENERATING FINANCIAL STATEMENT COMPLYING WITH ACCOUNTING STANDARD

(75) Inventor: Patanjali Bhatt, Cupertino, CA (US)

(73) Assignee: INTUIT INC., Mountain View, CA (US)

( * ) Notice: Subject to any disclaimer, the term of this patent is extended or adjusted under 35 U.S.C. 154(b) by 974 days.

(21) Appl. No.: 13/013,600

(22) Filed: Jan. 25, 2011

(65) Prior Publication Data

US 2012/0191580 A1 Jul. 26, 2012

(51) Int. Cl.
*G06Q 40/00* (2012.01)
*G06Q 40/04* (2012.01)

(52) U.S. Cl.
CPC ................ *G06Q 40/12* (2013.12)

(58) Field of Classification Search
CPC ...... G06Q 40/12; G06Q 40/00; G06Q 40/06; G06Q 10/00; G06Q 30/0269; G06Q 40/123; Y10S 707/99954; Y10S 707/95
See application file for complete search history.

(56) References Cited

U.S. PATENT DOCUMENTS

| | | | |
|---|---|---|---|
| 7,003,489 B1* | 2/2006 | Dixon et al. ...................... 705/38 |
| 7,590,647 B2 | 9/2009 | Srinivasan et al. | |
| 8,458,065 B1* | 6/2013 | Zhang .................... G06Q 40/04 705/35 |
| 2003/0018661 A1* | 1/2003 | Darugar ........................ 707/500 |
| 2003/0037038 A1* | 2/2003 | Block ............... G06F 17/30917 |
| 2003/0172013 A1* | 9/2003 | Block .................... G06Q 30/02 705/33 |
| 2003/0195780 A1* | 10/2003 | Arora et al. ....................... 705/7 |
| 2004/0059651 A1* | 3/2004 | MaGuire et al. .............. 705/30 |
| 2004/0230508 A1* | 11/2004 | Minnis, Jr. ............. G06Q 10/10 705/35 |
| 2005/0182777 A1* | 8/2005 | Block ............... G06F 17/30917 |
| 2005/0183002 A1* | 8/2005 | Chapus ......................... 715/505 |
| 2005/0197931 A1* | 9/2005 | Gupta .................... G06Q 40/00 705/30 |
| 2005/0216379 A1* | 9/2005 | Ozaki .................... G06Q 10/10 705/31 |
| 2005/0240467 A1* | 10/2005 | Eckart et al. ................... 705/10 |
| 2005/0267825 A1* | 12/2005 | Bernet ................... G06Q 10/10 705/30 |
| 2006/0155632 A1* | 7/2006 | Cherkas et al. ............ 705/36 R |
| 2006/0184539 A1* | 8/2006 | Blake .................... G06F 17/243 |

(Continued)

FOREIGN PATENT DOCUMENTS

JP 2008165641 A 7/2008
KR 1020100003769 A 1/2010

OTHER PUBLICATIONS

PCT International Search Report for PCT/US2011/025520, Applicant: Intuit Inc., Form PCT/ISA/210 and 220, dated Jan. 2, 2012 (5 pages).

(Continued)

*Primary Examiner* — Ryan Zeender
*Assistant Examiner* — Dana Amsdell
(74) *Attorney, Agent, or Firm* — Vista IP Law Group LLP

(57) ABSTRACT

Requirements, principles or guidelines of an accounting standard such as Generally Accepted Accounting Principles (GAAP) are transformed or codified into rules that specify how form, content and/or style of a certain portion of a financial statement, such as a header, should be configured while complying with the accounting standard. A rule engine compares attributes related to a financial statement and rules to determine which rule applies, and a selected rule specifies a header configuration. Relevant data received or retrieved from a source is used to generate or populate the header such that the header is automatically generated while complying with the accounting standard.

29 Claims, 17 Drawing Sheets

(56) References Cited

U.S. PATENT DOCUMENTS

| | | | |
|---|---|---|---|
| 2006/0259524 A1* | 11/2006 | Horton | G06F 17/24 |
| 2006/0288269 A1* | 12/2006 | Oppenlander et al. | 715/505 |
| 2007/0016486 A1* | 1/2007 | Stone et al. | 705/26 |
| 2007/0050698 A1* | 3/2007 | Chopin | G06F 17/246 |
| | | | 715/255 |
| 2007/0050702 A1* | 3/2007 | Chopin et al. | 715/507 |
| 2007/0078877 A1* | 4/2007 | Ungar | G06F 17/2247 |
| 2007/0088636 A1* | 4/2007 | Nault | G06Q 40/02 |
| | | | 705/30 |
| 2007/0150385 A1* | 6/2007 | Ode | 705/30 |
| 2007/0192265 A1* | 8/2007 | Chopin | G06Q 10/10 |
| | | | 706/20 |
| 2007/0244775 A1* | 10/2007 | Linder | G06Q 40/00 |
| | | | 705/35 |
| 2008/0059511 A1* | 3/2008 | Summers | G06F 17/30926 |
| 2008/0208720 A1* | 8/2008 | Dong | G06Q 40/06 |
| | | | 705/35 |
| 2009/0019358 A1* | 1/2009 | Blake | G06F 17/2247 |
| | | | 715/234 |
| 2009/0048883 A1* | 2/2009 | Kelly | G06Q 10/063 |
| | | | 705/30 |
| 2010/0030671 A1* | 2/2010 | Gelerman | 705/30 |
| 2010/0031141 A1* | 2/2010 | Summers | G06F 17/30926 |
| | | | 715/239 |
| 2010/0161471 A1* | 6/2010 | Fendick | G06Q 40/06 |
| | | | 705/35 |
| 2010/0205076 A1* | 8/2010 | Parson et al. | 705/30 |
| 2013/0179313 A1* | 7/2013 | Basu | G06Q 40/10 |
| | | | 705/30 |

OTHER PUBLICATIONS

PCT Written Opinion of the International Search Authority for PCT/US2011/025520, Applicant: Intuit Inc., Form PCT/ISA/210/220, dated Jan. 2, 2012 (5 pages).

https://en.wikipedia.org/wiki/EDGAR_Online, Nov. 2, 2015 (1page).

http://www.edgar-online.com/. Nov. 2, 2015 (1page).

http://www.edgar-online.com/DataContentSolutions.aspx, Nov. 2, 2015 (2pages).

https://www.sec.gov/investor/pubs/edgarguide.htm, Nov. 2, 2015 (9pages).

http://www.sec.gov/edgar.shtml, Nov. 2, 2015 (2pages).

* cited by examiner

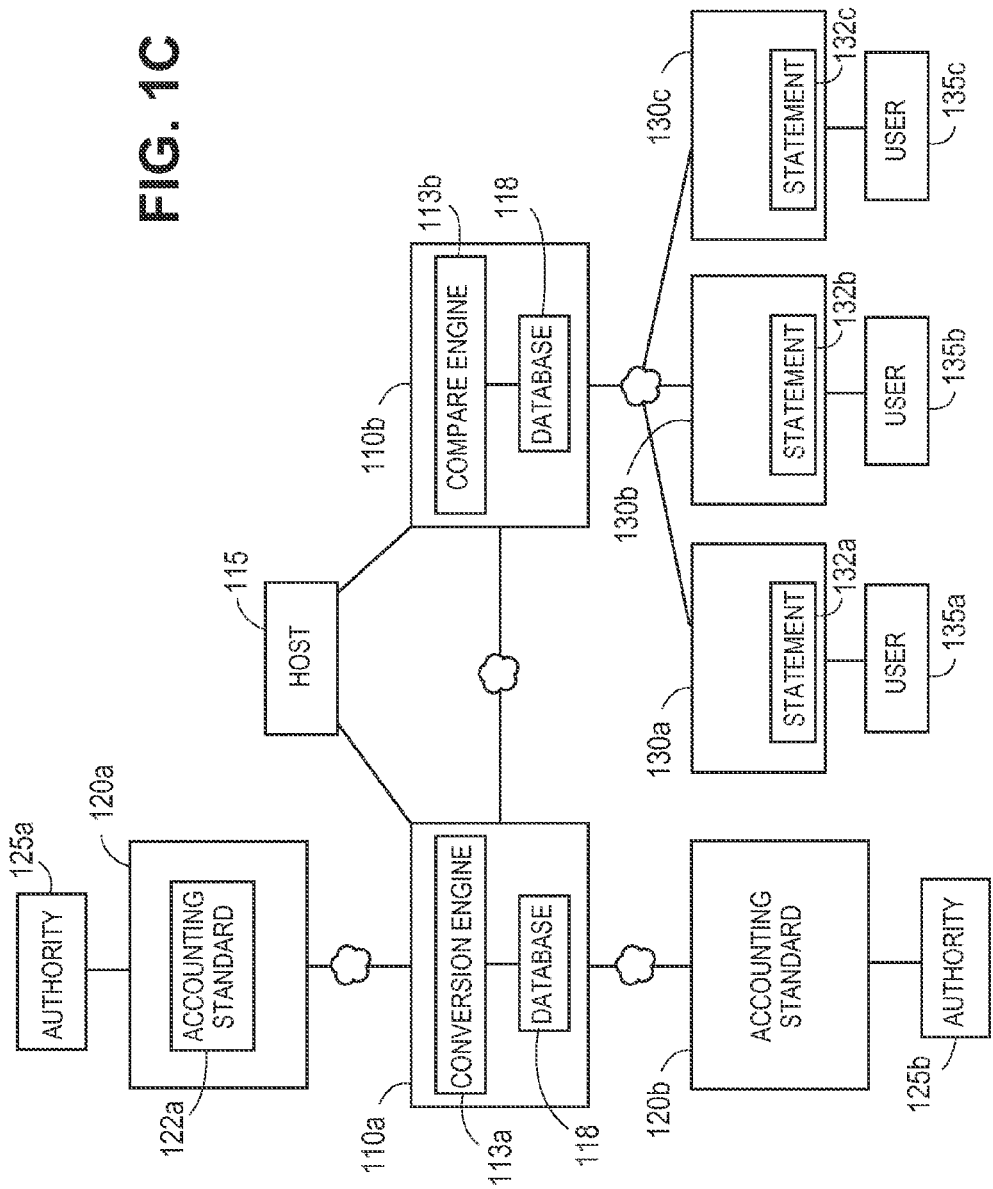

114

Rule 1: If GAAP AND

Entity Type = S Corporation OR C Corporation, AND

Industry Type = Manufacturing AND

Basis Type = Cash

THEN Configuration X (302d)

114

Rule 2: If GAAP AND

Entity Type = LLP OR LLLP, AND

Industry Type = Services AND

Basis Type = Cash

THEN Configuration Y (302d)

410

| Country / Attribute (133) | Accounting Standard (122) | Rule Set (114) |
|---|---|---|
| US | GAAP | Rule Set - 1 |
| Australia | A-IFRS | Rule Set - 2 |
| Canada | IFRS | Rule Set - 3 |
| Europe | IFRS | Rule Set - 3 |

METHODS SYSTEMS AND COMPUTER PROGRAM PRODUCTS FOR GENERATING FINANCIAL STATEMENT COMPLYING WITH ACCOUNTING STANDARD

BACKGROUND

Embodiments of the invention are related to preparation of financial documents such as financial statements. A financial statement quantitatively describes finances of a company and includes various types of financial information such as income, cash, etc. related to a company's financial condition. Financial statements are often generated quarterly and annually to provide information about the company to owners, employees, stockholders, potential investors and analysts.

Given the complexities of financial matters and the different uses of such statements by different people, accounting standards have been established to provide a common platform for companies to report accounting or financial information. One known accounting standard is Generally Accepted Accounting Principles (GAAP), which is utilized in the United States. Other countries utilize variations of GAAP or International Financial Reporting Standards (IFRS). Further aspects of GAAP are described in the following references, the contents of which are incorporated herein by reference as though set forth in full:

http://asc.fasb.org/,
http://asc.fasb.org/imageRoot/18/6896518.pdf, and
http://en.wikipedia.org/wiki/Generally_Accepted_Accounting_Principles.

While accounting standards provide structure and guidance regarding how accounting information is generated and presented, such structure and guidance result in complexities and complications for accountants who have to generate financial statements that comply with the accounting standard. For example, accounting standards such as GAAP specify that certain sections of a financial statement, such as a header, must contain certain information arranged and expressed in a particular manner. The header content and arrangement may vary depending on various factors such as a corporate or organization structure of the company (e.g., a corporation or partnership), the analysis involved (e.g., whether an "audit" or a "compilation"), the type of statement to be prepared (e.g., an income statement vs. a balance sheet).

For example, the applicable requirement may specify that in an income statement, the title states "Statement of Operations" if a net loss occurred, whereas the title is "Statement of Income" otherwise. As another example, for monthly statements, the first month may state "For the Month Ended Oct. $31^{st}$ 2010" whereas for subsequent months, the date is stated as "For the 2 Months Ended Nov. $30^{th}$ 201." As another example, a title may include a qualifier and state "Statement of Operations—Income Tax Basis" if cash basis is utilized, whereas the "Income Tax Basis" qualifier is not included if cash basis is not utilized.

Remembering the multitude of accounting standard requirements, how requirements apply to various aspects of the financial statement being prepared, and how a header is configured can be complicated, frustrating and time consuming, particularly if the accounting standard changes over time or the accountant prepares financial statement involving different standards and configurations. These issues may result in an accountant not knowing the correct header configuration for a particular financial statement and the financial statement failing to comply with the accounting standard. Further issues may arise when data of the header is to be modified to, for example, reflect a different date, range of dates, time periods, other updates or changes.

Some accountants utilize "string" replacement in which a header includes, for example, a "<<DATE>>" field that is updated or replaced as needed. Strings, however, do not address shortcomings discussed above since they assume that the accountant already knows the accounting standard and correct header configuration. Further, the onus is on the accountant to prepare the header and decide which strings must be utilized.

SUMMARY

One embodiment is directed to a computer-implemented method, which can be executed by a processor or engine executing one or more instructions, for determining how a pre-determined portion (such as a header or footer) of a financial statement should be configured for compliance with an accounting standard such as GAAP or IFSA. The computer-implemented method comprises determining, with a rule engine executing on a first computer, respective data of at least one pre-determined attribute related to the financial statement and accessing a database including rules representing respective requirements or guidelines of the accounting standard. The method further comprises the rule engine comparing respective data of the at least one pre-determined attribute and the plurality of rules, selecting a rule based at least in part upon the comparison, and determining a configuration of the pre-determined portion of the financial statement based at least in part upon the selected rule.

A further embodiment is directed to a computer-implemented method, which can be executed by a processor or engine executing one or more instructions, for generating rules based on an accounting standard for use in determining how a pre-determined portion of a financial statement should be configured for compliance with an accounting standard using those generated rules. The method comprises receiving, at a first computer, first requirements or guidelines of a first accounting standard, and transforming first requirements or guidelines into first respective meta-rules with a conversion processor or engine executing on the first computer. The method further comprises storing the first respective meta-rules in a database and transmitting or providing access to the first respective meta-rules to respective computers of respective end users of a program operable to prepare respective financial statements in compliance with the first accounting standard. The meta rules may then be utilized by a rule processor or engine to determine a configuration of a pre-determined portion of a financial statement.

Other method embodiments are directed to preparing a financial statement with a financial statement software program including a rule processor engine, which is executed to determine how to configure a pre-determined portion of the financial statement (e.g., a header, footer or other pre-determined portion). The configuration may be presented to a user who then prepares the pre-determined portion, or the pre-determined portion can be automatically generated or populated with data received or retrieved from a source such as a ledger or content of a financial statement.

Method embodiments may be implemented on or by a computer utilized by a person preparing a financial statement, e.g., in a desktop version of a financial statement software program including rule database, rule engine and/or conversion engine. Method embodiments may also be implemented on or by a computer that hosts a financial statement software program including rule database, rule engine and/or conversion engine so that a preparer can execute a browser on a computer to access the host computer for on-line access to the financial statement software program.

Yet other embodiments are directed to computer program products (e.g., an optical disc or other storage media) including a financial statement software program that includes or can access a database, rule engine and/or conversion engine. The disc or other media comprises a non-transitory computer readable storage medium embodying one or more instructions executable by a computer to perform processes for determining how a pre-determined portion of a financial statement should be configured for compliance with an accounting standard.

Further embodiments are directed to systems for determining how a pre-determined portion of a financial statement should be configured for compliance with an accounting standard. System embodiments may involve or include a financial statement software program executing on or accessible by a computer of a preparer of a financial statement. The financial statement software program is configured or programmed to determine how a pre-determined portion of a financial statement should be configured for compliance with an accounting standard. The financial statement software program may be configured or programmed to determine respective data of at least one pre-determined attribute related to the financial statement, access a database including rules representing respective requirements or guidelines of the accounting standard, compare respective data of the at least one pre-determined attribute and the plurality of rules, select a rule based at least in part upon the comparison, and determine a configuration of the pre-determined portion of the financial statement based at least in part upon the selected rule. The database may be a part of or accessible by the financial statement software program.

In another embodiment, the financial statement software program is configured or programmed to receive first requirements or guidelines of a first accounting standard, transform the first requirements or guidelines into first respective meta-rules, and store the first respective meta-rules in a database. The meta-rules may be utilized to determine a configuration of a pre-determined portion of a financial statement.

System embodiments may involve one or multiple computers. In one embodiment, a host computer is in communication with a computer or other source of requirements or guidelines of an accounting standard such that the requirements or guidelines are received or retrieved, transformed into meta-rules, and stored for use when preparing a financial statement.

Further embodiments are directed to an electronic financial statement that is structured to be populated with or import data according to a configuration determined with meta-rules, which are based at least in part upon requirements or guidelines of an accounting standard such as GAAP. For this purpose, for example, the header, footer or other pre-determined portion may be identified or defined within the financial statement such that the pre-determined portion is automatically generated according to the determined configuration or populated or imported into a pre-determined space of the financial statement.

Yet further embodiments are directed to a database comprising a plurality of meta-rules representing respective requirements or guidelines of one or multiple accounting standards. These meta-rules may be utilized by one or multiple end users or preparers of financial statements.

In a single or multiple embodiments, a conversion engine transforms requirements or guidelines of an accounting standard or convention such as GAAP, IFRS or another accounting standard, that dictates requirements, principles, guidelines, rules or procedures (generally, "requirements") regarding how financial data should be reported or presented within a financial statement. The requirements can be transformed into and represented as respective meta-rules expressed with Extensible Markup Language (XML), Boolean logic or expressions or a hierarchy of attributes related to a financial statement.

For example, a meta-rule may specify that for an entity that is a US corporation, a certain accounting standard or set of rules applies, and for entities that are "S" corporations, a first subset of meta-rules may apply, and if that entity is preparing a financial statement for an "audit" then a further defined subset of rules apply, and so on. The result of the rule engine comparisons is identification a single rule or multiple rules. If multiple rules are identified, a user or preparer of the financial statement may be presented with the multiple rules and select which rule should apply. A user may also confirm a rule generated or selected by an engine.

A meta-rule generated according to embodiments may specify various attributes of a header or footer such as content, arrangement, order of information, and form, (how dates or periods of time are structured). Thus, the configuration for a rule may specify content and/or spatial arrangements and form for manual generation of the pre-determined portion by an end user or automatic generation or population of the pre-determined portion. For this purpose, data of the pre-determined portion may be retrieved or received from one or more sources such as a ledger, a different portion of the financial statement or manually entered by a user or preparer.

In a single or multiple embodiments, the conversion engine is applied to requirements or guidelines of multiple accounting standards, and the rule database includes meta-rules representing respective requirements of respective accounting standards. Determining which accounting standard applies to a particular financial statement may be based at least in part upon a geographic location of the entity. For example, GAAP may be applicable for US corporations, whereas another accounting standard may be applicable for corporations of other countries.

In a single or multiple embodiments, the meta-rule that is selected for determining how a pre-determined portion is configured is selected based at least in part upon a pre-determined attribute related to the financial statement, defined to include an attribute of an entity for which the financial statement is to be prepared. Attributes that may be utilized to select a meta-rule include, but are not limited to, a corporate or organizational structure of the entity (e.g., whether a corporation or partnership and which type), a type of business conducted by the entity (e.g., manufacturing, services, etc.), a type of engagement, service or analysis requested by the entity (e.g., compilation, review, audit), an accounting basis utilized by the entity (e.g., (income) tax, cash, modified cash, accrual, regulatory), a type of financial statement to be prepared for the entity (e.g., income, balance sheet, statement of operations).

Embodiments may involve selection of a meta-rule for determining a configuration based on one or multiple pre-determined attributes and different combinations thereof.

A configuration of a header or other portion of a financial statement may specify various aspects of the header, e.g., one or more or all of the form, content and/or style of a date, number of periods of time or range of dates, a name of the entity, a type of the financial statement, and an accounting standard utilized.

BRIEF DESCRIPTION OF THE DRAWINGS

The foregoing and additional aspects of embodiments are described in further detail with reference to the accompanying drawings, wherein:

FIG. 1C is a block diagram of a system constructed according to another embodiment for codifying or transforming an accounting standard into rules and utilizing rules to determine how to configure a pre-determined portion of a financial statement;

FIG. 4A illustrates a table relating accounting standards and rules derived from the accounting standards for different countries.

DETAILED DESCRIPTION OF ILLUSTRATED EMBODIMENTS

Embodiments relate to systems, methods and computer program products that generate rules derived from or that codify requirements of an accounting standard and utilize those rules to determine how a header or other portion of a financial statement with particular attributes should be configured to comply with the standard.

Financial statements having different attributes result in selection of different rules which, in turn, may result in a determination that headers for different financial statements must be configured in different or certain ways to comply with an accounting standard. After a rule and corresponding configuration are identified based on financial statement attributes, the header can be automatically populated or generated without input of a person preparing the statement by importing data into the header configured per the rule from a ledger, the financial statement or another electronic document. The header configuration, e.g., in the form of a template, can also be presented to the person who then manually enters data to prepare a header configured per the rule.

In this manner, embodiments eliminate or reduce the uncertainty whether certain portions of financial statements comply with an accounting standard since configurations that are utilized are based on rules derived from accounting standard requirements. Further, when revisions or updates to a financial statement are to be made, the identified configuration dictates how those revisions or updates are formatted or displayed so that they also comply with accounting standard. Thus, embodiments provide a more effective manner of preparing portions of financial statements that comply with accounting standards and do not need to utilize less effective replacement strings. Further aspects of embodiments are described with reference to FIGS. 1A-11.

Figure 1A:
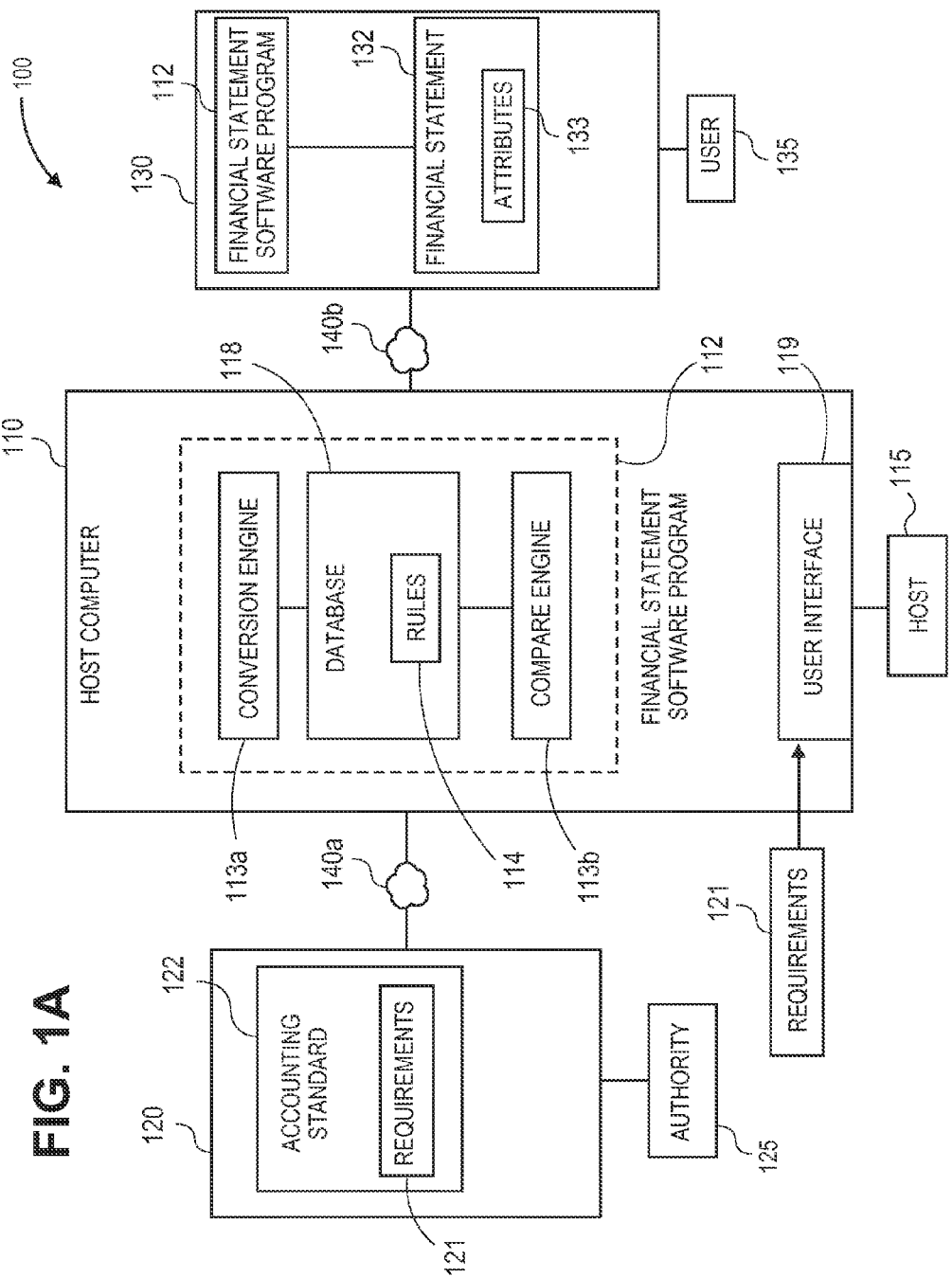
FIG. 1A is a block diagram of a system constructed according to one embodiment for codifying or transforming an accounting standard into rules and utilizing rules to determine how to configure a pre-determined portion of a financial statement.

Referring to FIG. 1A, a system 100 constructed according to one embodiment for generating rules 114 and using those rules 114 to determine how certain pre-determined portions of a financial statement 132 should be configured to comply with an accounting standard 122 comprises or involves a computing device or computer 110 (generally, "computer") of a host 115, a computer 120 of an authority 125 that specifies or creates the requirements, principles or guidelines 121 (generally, requirements 121) of an accounting convention or standard 122 (generally, "standard 122"), and a computer 130 of an end user 135 such as an accountant or other person preparing a financial statement 132.

Computers 110, 120, 130 may be servers, desktop computers, laptop computers or mobile communication devices such as a Smartphone or tablet computing device (generally, "computer") that can execute software programs such as financial statement software program 112, one example of which is INTUIT Statement Writer and other software programs used to prepare financial statements 132. For example, end user 135 may utilize a desktop or laptop computer. End user 135 may also utilize a Smartphone to view, prepare and/or edit portions of financial statement 132.

Host computer 110, as shown in FIG. 1A, may be operably coupled to or in communication with authority computer 120 through a network 140a, and may also be operably coupled to or in communication with end user computer 130 through a network 140b. Examples of networks 140a-b (generally, 140) and other networks 140 discussed herein that may be utilized for communications between system 100 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 140 generally, but various networks, combinations of networks and communication systems, methods and protocols may be utilized.

Figure 1B:
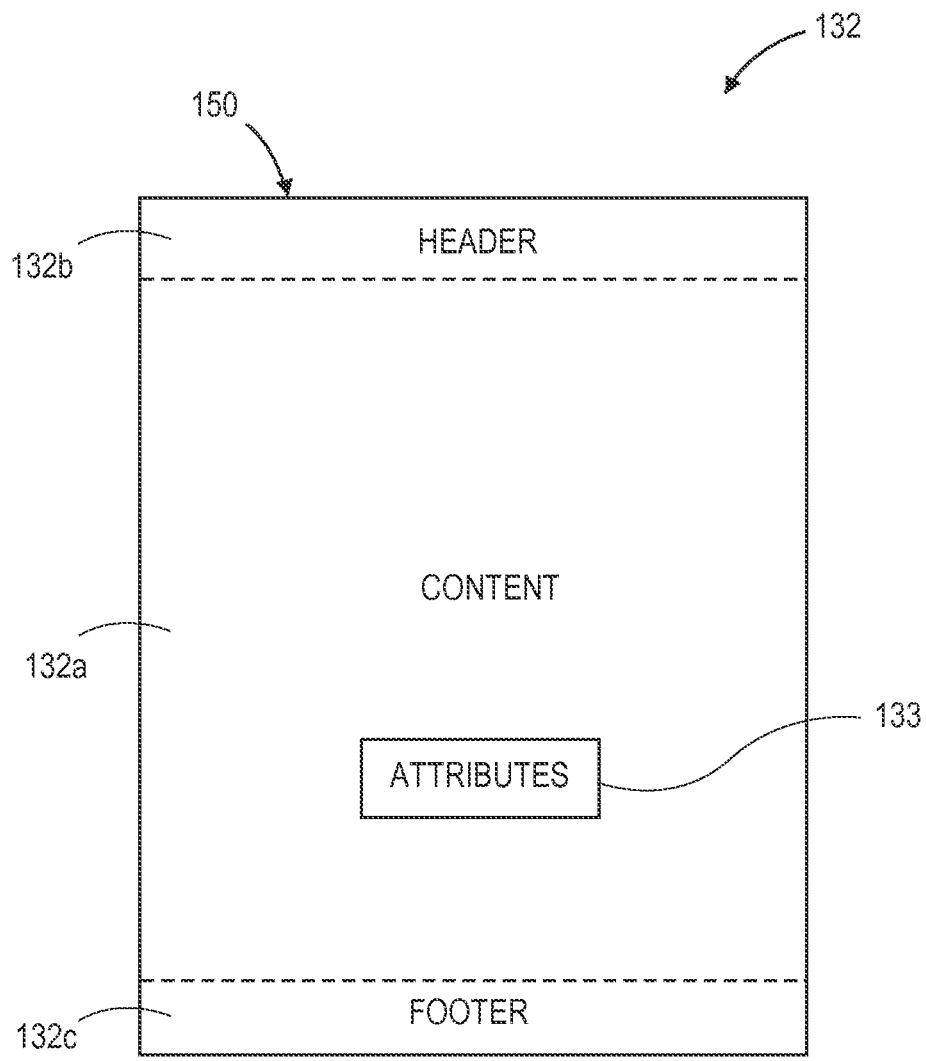
FIG. 1B illustrates a financial statement and portions thereof that may be pre-determined portions configured according to embodiments.

FIG. 1B generally illustrates a financial statement 132 including a portion for content 132a (e.g., company information, financial and accounting numbers, results, etc.), a header 132b, which often includes identification information and indicates, for example, company name, type of review, etc., and a footer 132c, which may include similar types of information. According to one embodiment, the pre-determined portion 150 that is configured according to a rule 114 with embodiments is header 132b. According to another embodiment, pre-determined portion 150 is footer 132c. Embodiments may also apply to multiple pre-determined portions 150 such as header 132b and footer 132c. Further, embodiments may be utilized to determine how other portions 150 besides a header and/or footer that are structured in a certain manner according to accounting standard 122. For ease of explanation, reference is made to determining how a pre-determined portion 150 or header 132b.

A first engine, processor or program 113a, otherwise referred to as a conversion engine 113a, executes on host computer 110 and, as described in further detail below, is programmed, configured or operable to receive and transform text of accounting standard requirements 121 into meta-rules 114 (generally, "rules" 114), which are stored in database 118. For this purpose, host computer 110 may be in communication with authority computer 120 via network 140a as shown in FIG. 1A to receive text of requirements 121. In other embodiments, host 115 enters text of requirements 121 into conversion engine 113a using a suitable interface 119.

A second software engine, processor or program, otherwise referred to as a compare engine 113b, executes on host computer 110 and, as described in further detail below, is programmed, configured or operable to access generated rules 114 in database 118. Compare engine 113b determines which rule 114 is appropriate for attributes of a given financial statement 132 and how pre-determined portion 150 of financial statement 132 should be configured according to the rule 114 to comply with the accounting standard 122.

In the illustrated embodiment, conversion engine 113a, compare engine 113b and database 118 are components of financial statement software program 112, one example of which is INTUIT Statement Writer. Engines 113a,b and database 118 may be components of and/or utilized by financial statement software program 112. Thus, financial statement software program 112 may include all or only some of these system components.

While FIG. 1A illustrates conversion engine 113a and rule compare engine 113b as separate engines, a single rule engine 113 that is programmed, configured or operable to perform these functions may also be utilized. For ease of explanation, FIG. 1A illustrates separate engines 113a,b for purposes of illustrating and describing their different functions. Further, while FIG. 1A illustrates both conversion and rule compare engines 113a,b executing on the same host computer 110 that also hosts database 118, host 115 may manage different computers 110 with respective rule engines 113.

For example, referring to FIG. 1C, a first host computer 110a may include conversion engine 113a and database 118 of generated rules 114, and a second host computer 110b may include compare engine 113b and database 118 as components of financial statement software program 112. One or multiple end users 135 (multiple end users are shown in FIG. 1C) may utilize a desktop version of financial statement software program 112 and may connect through network 140b to receive rule updates from host computer 110. End users 135 may also execute a browser on user computer 130 to access an on-line version of financial statement software program 112 on host computer 110.

Further, while FIG. 1A shows conversion engine 113a receiving text of requirements 121 of accounting standard 122 from one authority 125, conversion engine 113a can generate respective meta-rules 114 for respective requirements 121 of respective accounting standards 122 (as shown in FIG. 1C), and respective requirements 121 may, as noted above, be received electronically from an authority computer 120 or entered manually by host 115 via user interface 119.

Thus, while FIGS. 1A and 1C show financial statement software program 112 hosted by computer 110 that is in communication with end user computer 135, end user 135 may or may not utilize an on-line version of the financial statement software program 112 and instead may only access host computer 110 via network 140b to receive rule updates for a desktop version of financial statement software program 112, for example.

Thus, FIGS. 1A-C are provided to illustrate examples of how system embodiments may be implemented, and further embodiments and how system embodiments function are described with reference to FIGS. 2-12. Further details regarding how text of requirements 121 of an accounting standard 122 can be transformed or converted into rules 114 for use in embodiments are described with reference to FIGS. 2-4, and further details regarding how those generated rules 114 can be utilized to configure a pre-determined portion 150 of financial statement 132 are described with reference to FIGS. 6-10.

Transformation of Accounting Standard Requirements into Meta-Rules

Figure 2:
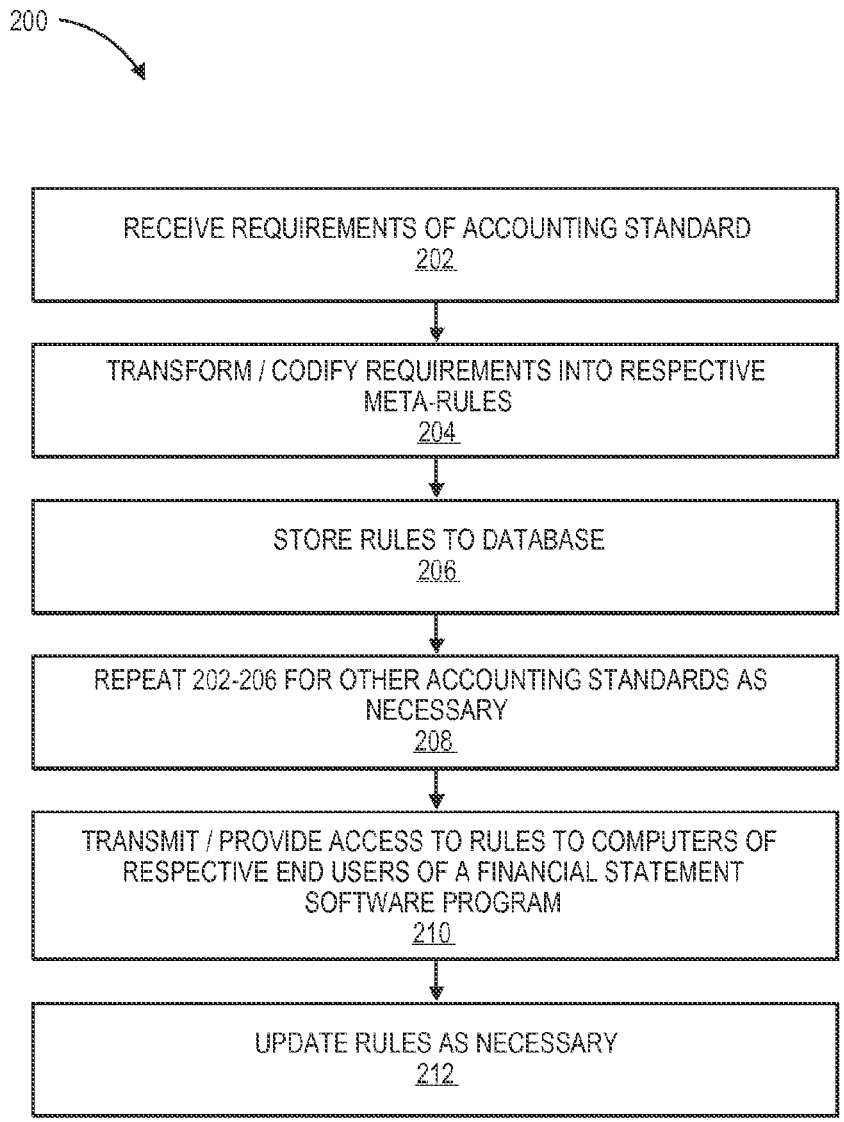
FIG. 2 is a flow diagram of one embodiment of a method for codifying an accounting standard into rules and storing rules to a database.

Referring to FIG. 2, and with continuing reference to FIGS. 1A-C, one embodiment of a method 200 for generating meta-rules 114 for use in determining how pre-determined portion 150 of financial statement 132 should be configured for compliance with accounting standard 122 involves, conversion engine 113a receiving text of requirements 121 of accounting standard 122 at step 202.

Embodiments may apply to accounting standards 121 utilized in the United States and other countries. Examples of accounting standards 121 that embodiments may utilize include, but are not limited to GAAP and IFRS, which specify requirements, principles or guidelines for recording and summarizing transactions and preparing financial statements 132. It will be understood that embodiments may involve various accounting standards.

According to one embodiment, accounting standard requirements 121, e.g. text thereof, are received at host computer 110 through network 140 from authority computer 120. According to another embodiment, text of requirements 121 is received at host computer 120 by host 125 manually entering text via user interface 119.

With continuing reference to FIG. 2, at 204, conversion engine 113a receives text of requirements 121 as an input and transforms or codifies them into respective meta-rules 114 or rules structured or formatted in a different manner compared to requirements 121 and that describe how requirements 121 are implemented. According to one embodiment, requirements 122 of accounting standard 121 are codified or expressed as rules 114 based on how tax laws are codified for use in tax preparation applications such as TURBO TAX and TAX CUT. TURBO TAX is a registered trademark of Intuit Inc., Mountain View, Calif.

According to one embodiment, codification of accounting standard requirements 121 is performed using conversion engine 113a by manually entering requirement 121 data into conversion engine 113a, which then transforms or codifies the text into meta-rules 114 expressed in Extensible Markup Language (XML) or another suitable language. These rules 114 are output by conversion engine 113a and stored to database 118 at step 206. Conversion engine 113a can also be automated such that requirement 121 data is fed into conversion engine 113a without manual entry by host 125 and rules 114 are output by conversion engine 113a to database 118.

In one embodiment, requirements 121 are transformed into rules 114 expressed in terms of attributes 133 related to financial statement 132. Rules 114 may be structured to reflect which accounting standard requirements 121 or aspects thereof apply when a financial statement 132 involves certain attributes 133 or combination thereof.

Attributes 133 that may be utilized for this purpose include, but are not limited to, a corporate or organizational structure of the entity (e.g., a corporation such as C, S, PC), partnership such as LP, LLP, LLLP), LLC, etc.), a type of business conducted by the entity (e.g., manufacturing, service, etc.), a type of engagement or service requested by the entity (e.g. a compilation, review or audit), an accounting basis utilized by the entity (e.g., cash, modified cash, (income) tax), a type of financial statement 132 to be prepared for the entity (e.g., balance sheet, income statement, cash flow statement). It will be understood that different and various numbers of attributes 133 may be utilized, and the attributes 133 may vary by country of the entity for which financial statement 132 is being prepared.

FIGS. 3A-D provide visual depictions of how rules 114 can be structured to represent which accounting standard requirements 121 or aspects thereof apply to a given financial statement 132 with certain attributes 133 to indicate how a header 132b or other pre-determined portion 150 of financial statement 132 should be configured. While these figures show how rules 114 are structured for multiple attributes 133, it will be understood that rules 114 may be structured with different numbers and/or types of attributes 133 (e.g., two, three, four, five, six and other numbers of attributes 133). Further, the result may be identification of one or multiple possible configurations 302, but the following examples show how a single configuration 302 is identified by compare engine 113b.

Figure 3A:
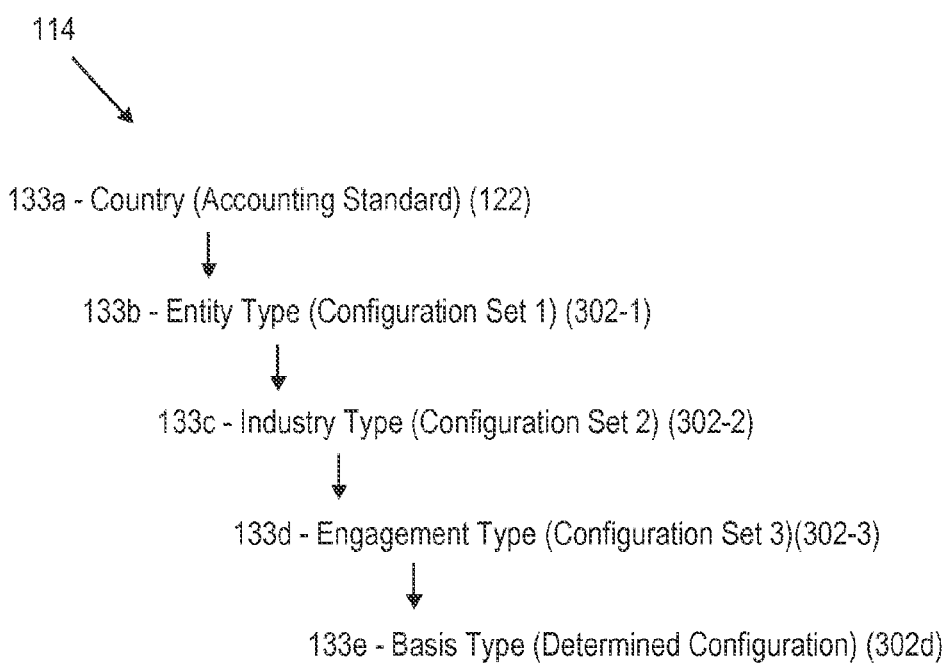
FIGS. 3A-D depict how rules derived from accounting standard requirements may be structured based at least in part upon attributes related to a financial statement.
Figure 3B:
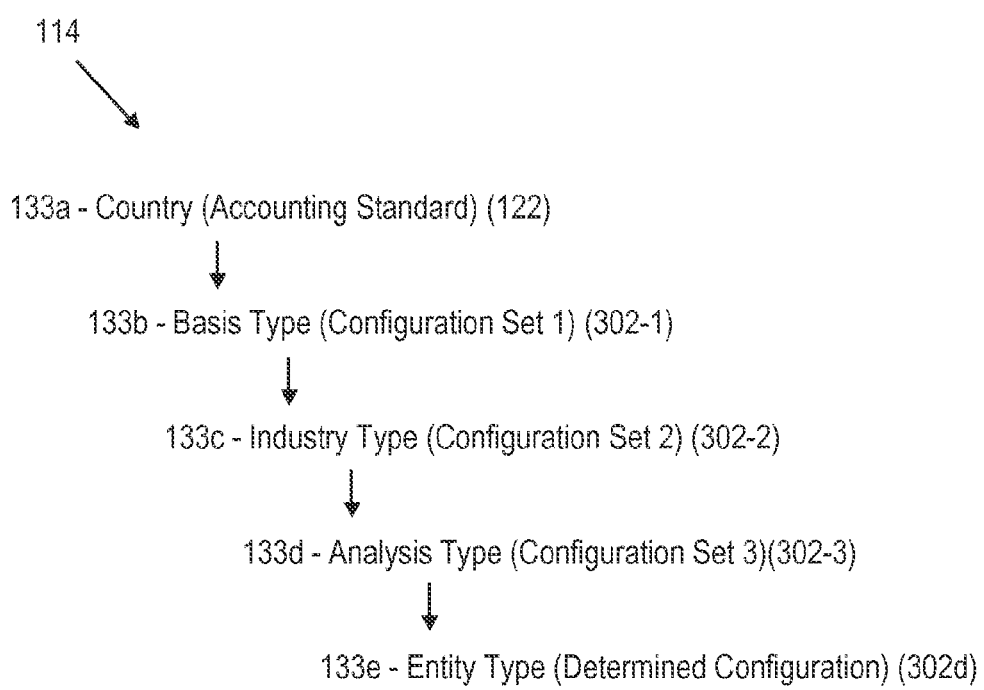

Referring to FIG. 3A, a first attribute 133a may indicate that a company is within a certain country (e.g. United States) such that conversion engine 113a determines that rules 114 derived from GAAP 122 apply. Possible header configurations 302 specified by rules 114 are narrowed to a first Configuration Set 1 (302-1) based on an attribute 133b of a type of entity (e.g., if entity is a C corporation), further narrowed to Configuration Set 2 (302-2) based on an attribute 133c of a type of industry (e.g. services), further narrowed to Configuration Set 3 (302-3) based on an attribute 133d of engagement type (e.g., audit), and further narrowed to Configuration Set 4 (302-4) based on an attribute 133e of accounting basis (e.g. modified cash). The result is compare engine 113b selecting or determining that configuration 302d ("d" referring to determined or selected) applies to financial statement 132 with those attributes 133 as determined according to the specified attribute hierarchy. FIG. 3B illustrates another example of how a rule 114 may be expressed in terms of a different hierarchy or order of attributes 133 to determine which configuration 302d should be utilized.

Figure 3C:
Figure 3D:

Referring to FIGS. 3C-D, a rule 114 derived from requirements 121 of accounting standard 122 can also be expressed as a Boolean expression, which specifies that if certain attributes 133 are involved, then the rule output is a header configuration 302d determined to apply. Thus, in the illustrated embodiment, certain combinations of attributes 133 may identify a particular header configuration 302d, whereas other attribute combinations 133 result in determining that another configuration 302d applies.

Figure 4B:
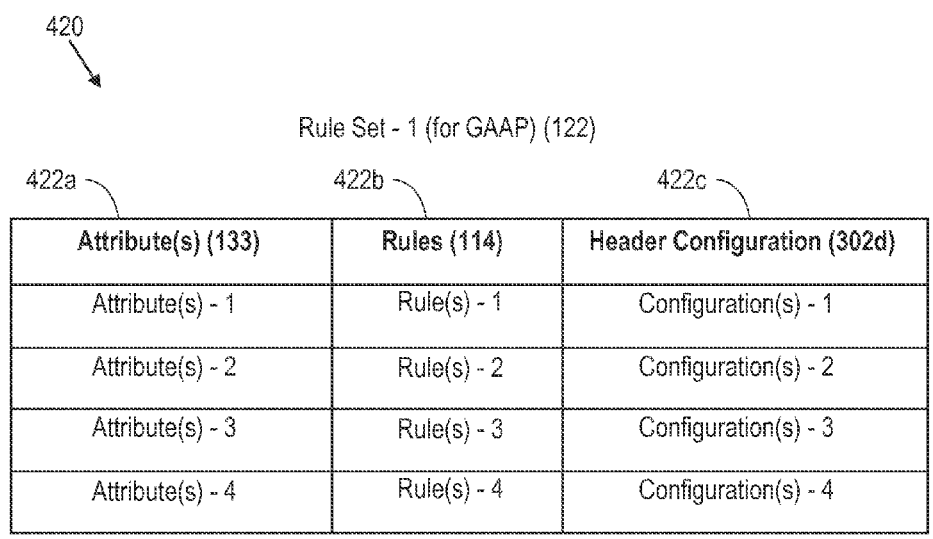
FIG. 4B illustrates a table further showing rules derived from accounting standards and related configurations of a pre-determined portion of a financial statement.

Referring to FIGS. 4A-B, rules 114 derived from accounting standard requirements 121, however rules 114 are formatted or expressed, may be stored in one or more tables 410 in database 118. For example, as shown in FIG. 4A, a table 410a may include a first column or section 412a for country, a second column or section 412b for accounting standard 122 and a third column or section 412c for rules 114 that were generated and derived from requirements 121 of accounting standard 122. FIG. 4B generally illustrates how column or section 412c or a separate table 420 may be structured with columns 422a-c to identify rules 114 associated with particular attributes 133 or combinations thereof, and corresponding header configurations 302 that should be utilized so that the financial statement 132 with those attributes 133 complies with applicable accounting standard requirements 121.

A configuration 302 identified by a rule 114 may specify one or more or all of content, form and arrangement or style of the header 132b or other pre-determined portion 150 of the financial statement 132. The configuration 302 may, for example, specify how certain header 132b or footer 132c information is presented or arranged, the location of different types of data, the format or how certain text is presented (e.g., acceptable titles, how dates or periods of time are presented and the formats or suitable expressions for such dates, date ranges and periods of time, etc.), and the order or arrangement of different types of information to be included in a header 132b or footer 132c (e.g., how a corporation name, type of statement, and dates are arranged and in which order).

Figure 5:
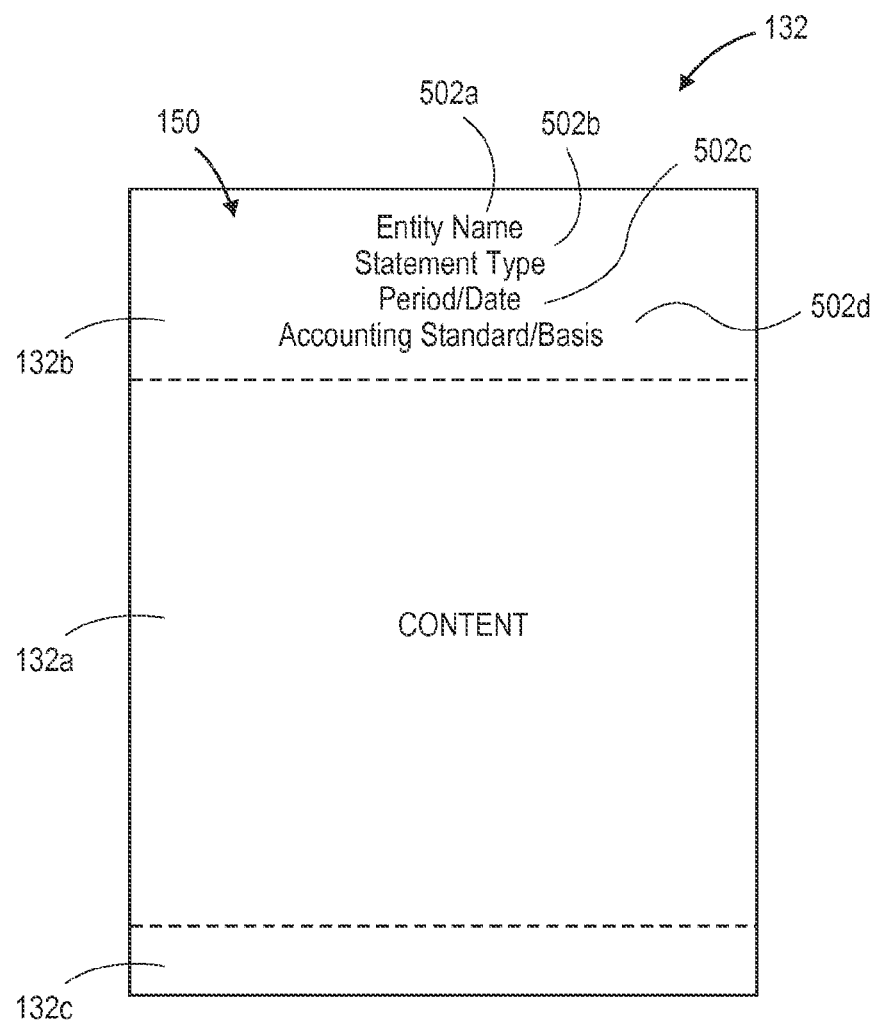
FIG. 5 illustrates one example of how embodiments may be implemented to specify a configuration of a header of a financial statement.

For example, referring to FIG. 5, a configuration 302 may specify how data of a company name 502a, type of statement 502b, dates 502c and accounting standard 502d are formatted and arranged within header 132b. In the illustrated example, the company name 502a is first, followed by a specified type of the financial statement 502b, followed by a particular date 502c format for when the financial statement 132 was reviewed, and then a particular date 502d format for when the financial statement 132 was compiled. Further examples of the how these and other types of data may be structured according to a configuration 302 follow.

For example, configuration 302d of rule 114 accommodates and may specify the content and/or format of the following attributes 133 as follows:

Accounting basis information: Accrual; Cash; Modified Cash; (Income) Tax; Regulatory; and Other.

Level or type of service or engagement: Compiled; Reviewed; Audited; and Unaudited.

Periods of Time: Month; Three Months; Six Months; Twelve Months; Quarter; and Year.

Titles for a balance sheet type of financial statement 132: Balance Sheet; Statement of Financial Position (for certain industries); and Statement of Financial Condition (personal statements).

For OCBOA statements: Statement of Assets, Liabilities, and Equity (Capital)—Cash Basis; and Statement of Assets, Liabilities, and Equity (Capital)—Income Tax Basis.

Titles for an income statement type of financial statement 132: Statement of Income; Statement of Operations (when a business has lost money); Income Statement; and Statement of Earnings.

Titles if the Income Statement is combined with the Retained Earnings: Statement of Income and Retained Earnings; Statement of Earnings and Retained Earnings; and Statement of Operation and Retained Earnings.

Other statement titles that may be specified by a configuration include Statement of Cash Flow; and Budget to Actual.

Content and format for ending dates in a title of a Balance Sheets: Ending dates are separated by "AND" and dates are in descending order as in the following examples: Dec. 31, 20X2 and 20X1; Aug. 31, 2010 and 2009; Dec. 31, 20X2 and Mar. 31, 20X1.

Date adjustment: Continuing with the above three examples, if the end date is incremented by 1 month, the configuration may specify that adjustments be specified as in the following examples: Jan. 31, 20X3 and 20X2; Sep. 31, 2010 and 2009; and Jan. 31, 20X3 and Apr. 30, 20X2. If one date is a custom date that is not updated, then one date is updated whereas another is not.

Periods of time and dates for income statements, cash flow statements and retained earnings: (For the) (N) Period (S) Ended Date (s), Year(s)" where dates or years are separated by "AND" as in the following examples: For the Years Ended Dec. 31, 20X2 and 20X1 (two years); For the 3 Months and 6 Months Ended Aug. 31, 2010; For the Years Ended Dec. 31, 2009 and 2008; Years Ended Dec. 31, 2009 and 2008; Year Ended Dec. 31, 2008 (one year only); For the Twelve Months Ended Sep. 30, 2009; Year Ended Dec. 31, 2008; Year (52 Weeks) Ended Dec. 27, 2008; For the 3 Months Ended Mar. 31, 2010 and 2009; For the 3 Months Ended Mar. 31, 2010 and Year Ended Dec. 31, 2009; and Quarter (13 Weeks) Ended Apr. 7, 2009, 2 Quarters (13 Weeks) Ended Jul. 14, 2009, and 3 Quarters (13 Weeks) Ended Oct. 21, 2009.

Referring again to FIGS. 1A, 1C and 2, after requirements 121 of accounting standard 122 are transformed into respective rules 114, which specify configurations 302 for financial statement headers 132b, rules 114 are stored to database 118 at 206, e.g. in one or more tables as illustrated in FIGS. 4A-B, and at 208, steps 202-206 can be repeated for other accounting standards 122 such that database 118 may store rules 114 for other accounting standards 122 as needed. At 210, the engines 113a,b and rules 114, e.g., as components of the financial statement software program 112, are transmitted or provided to respective end users 135 who utilize desktop or on-line versions of financial statement software program 112. In the event of accounting standard or other relevant changes, any rule changes can be transmitted to end users as necessary to update the database. Rules 114 are utilized to populate or generate headers 132b for financial statements 132, as described in further detail below with reference to FIGS. 6-11.

Meta-Rule Application for Determining Header Configuration

Figure 6:
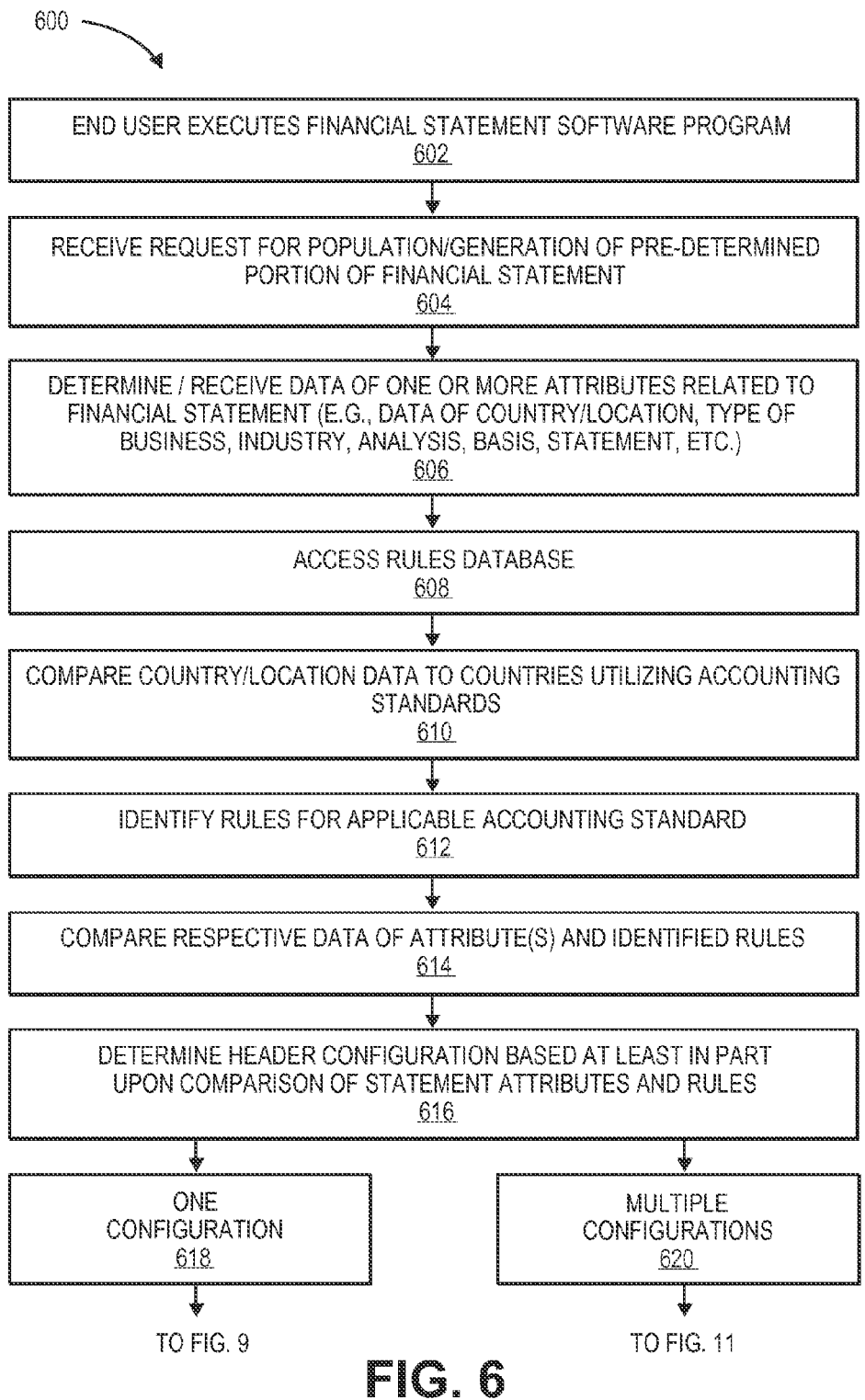
FIG. 6 is a flow diagram of one embodiment of a method for comparing attributes and rules and selecting a single rule to be used for indicating how a pre-determined portion of a financial statement should be configured.
Figure 7:
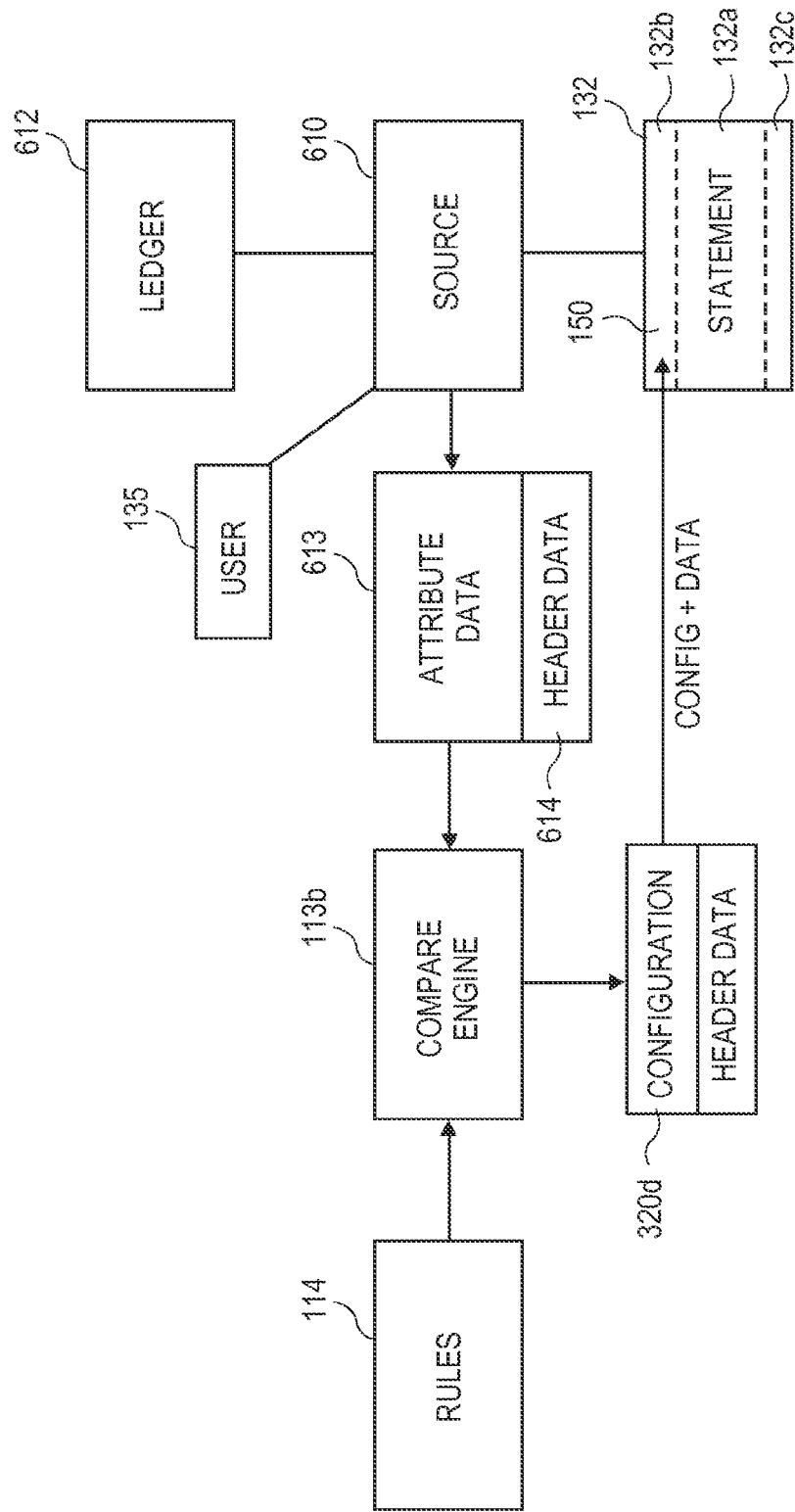
FIG. 7 is a block diagram illustrating how a compare engine determines a configuration based on financial statement criteria.

Referring to FIGS. 6-7, rules 114 generated according to embodiments may be utilized in a method 600 for determining how a pre-determined portion 150 of financial statement 132 should be configured for compliance with accounting standard 122. System and meta-rule 114 details discussed above with reference to rule 114 generation and FIGS. 1A-5 are not repeated for ease of explanation.

At step 602, end user 135 such as an accountant executes financial statement software program 112 to begin or continue preparation of a financial statement 132. At step 604, compare engine 113b is activated in response to a user 135 request via or compare engine 113b determining that financial statement 132 has been opened or is being prepared and receives a request to populate or generate header 132 or other portion 150 of financial statement 132.

At step 606, compare engine 113b receives or determines data 613 of one or multiple pre-determined attributes 133 related to financial statement 132 (e.g., country/location, type of business, industry, analysis, basis, statement, etc. as described above with reference to generation of rules 114). According to one embodiment, step 604 is performed automatically by compare engine 113b by reading or retrieving data 613 of attributes related to financial statement 132 and data 614 to be included in header 132b per the determined configuration 302d from one or more sources 610 such as the financial statement 132, a ledger 612 or other electronic document or database with attribute 133 data. Data 613, 614 may also be manually entered by user 135. It will be understood that data 613 and 614 are not necessarily transmitted to compare engine 113b at the same time. For example, data 613 of attributes 133 may be transmitted first for purposes of determining a configuration 302d, and then data 614 can be transmitted thereafter, as explained below.

Figure 8:
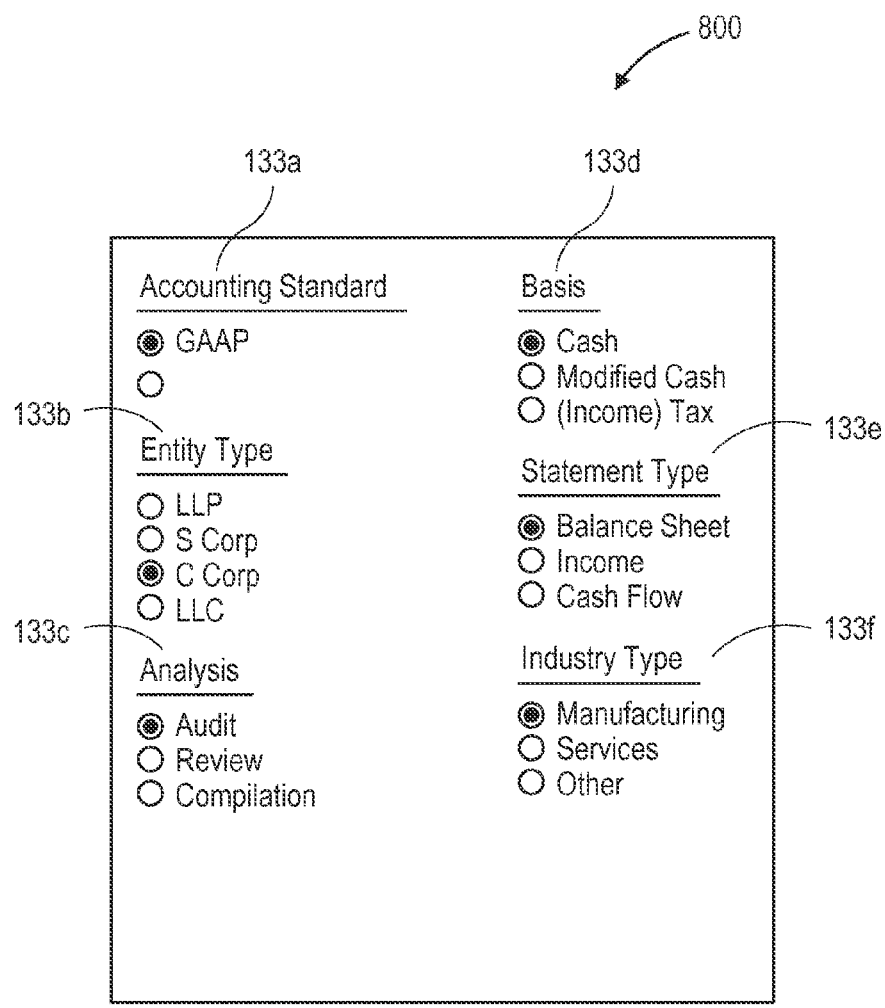
FIG. 8 illustrates one embodiment of a user interface that may be utilized to enter or select attributes of a financial statement.
Figure 9:
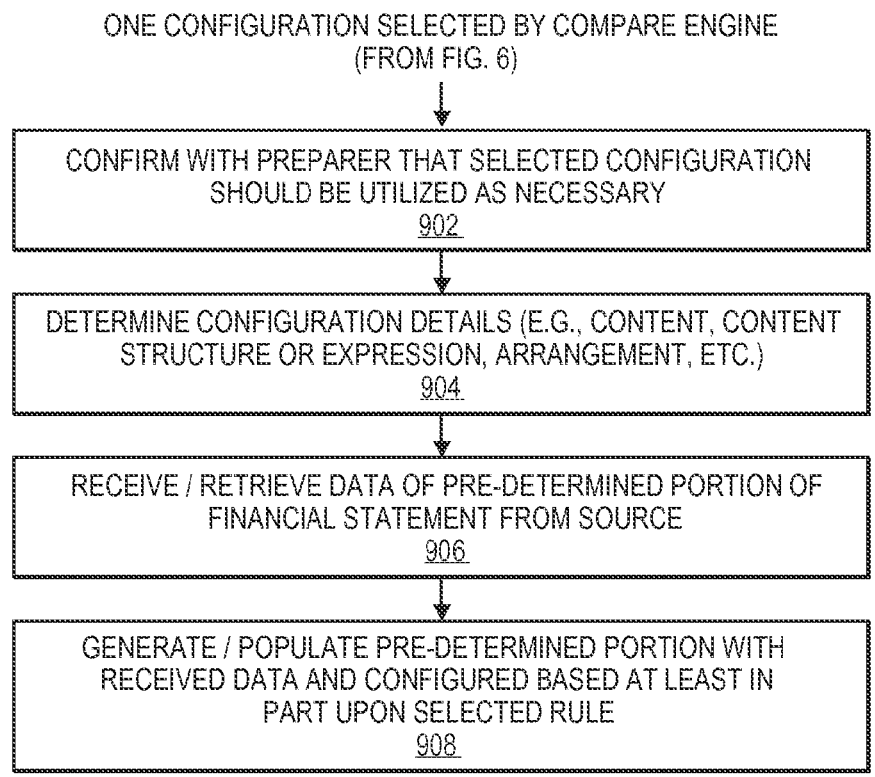
FIG. 9 is a flow diagram of one embodiment of a method for determining a configuration of pre-determined portion of financial statement based at least in part upon single rule selected by a rule engine and populating or generating the pre-determined portion.

Referring to FIG. 8, according to another embodiment, compare engine 113b receives attribute 133 data that was manually entered by end user 135. For this purpose, financial statement software program 112 may provide a user interface 800 that may be utilized by end user 135 to enter or select attribute 133 data. For example, in the illustrated embodiment, user interface recites various types of attributes 133 such as Accounting Standard 133a, Entity Type 133b, Analysis Type 133c, Basis 133d, Statement Type 133e and Industry Type 133f with corresponding options 802 for each that can be selected by end user 135. According to another embodiment, user interface 800 may include fields that allow end user to manually type attribute data. Thus, it will be understood that FIG. 8 is provided as one example of how embodiments may be implemented for manual data entry, and to illustrate that attribute 133 data can be received by compare engine 113b from an electronic source without requiring end user 135 to enter data or as a result of manual data entry by end user 135.

Referring again to FIGS. 6-7, at step 608, compare engine 113b accesses database 118, and at 610, compares attribute 133 data of location or country of the entity for which financial statement 132 is being prepared and countries that utilize accounting standards 122.

At step 612, compare engine 113b identifies the applicable rules 114 (e.g., rules 114 derived from GAAP requirements to be utilized for US companies), and at step 614, compares respective data of pre-determined attribute(s) 133 and rule 114 criteria, e.g., based on rule structures described above with reference to FIGS. 3A-4B.

For example, compare engine 113b may search the attribute column in the table 420 of FIG. 4B for attribute(s) determined or received at step 606 to identify corresponding rules 114 and header configurations 302 at step 616 based on the comparison. The result of step 616 may be compare engine 113b identifying one configuration 302d at 618 or multiple possible configurations 302d at 620.

Referring to 9, if compare engine 113b identifies a single configuration 302d, then at step 902, compare engine 113b may, request confirmation, e.g., through interface 800 or other suitable interface or screen generated by financial statement software program 112, from user 135 that determined configuration 302d and/or rule utilized to select configuration 302d should be utilized. If so, then at step 904, compare engine 113b determines the configuration 302 particulars such as content, content structure, arrangement, etc., and at step 906, receives, retrieves or requests data 614 from source 610 to be included in pre-determined portion 150 according to configuration 302d. For this purpose, for example, compare engine 113b may utilize mapping to or search pre-determined fields of ledger 612 or financial statement 132 to receive or retrieve relevant attribute 133 data.

Figure 10:
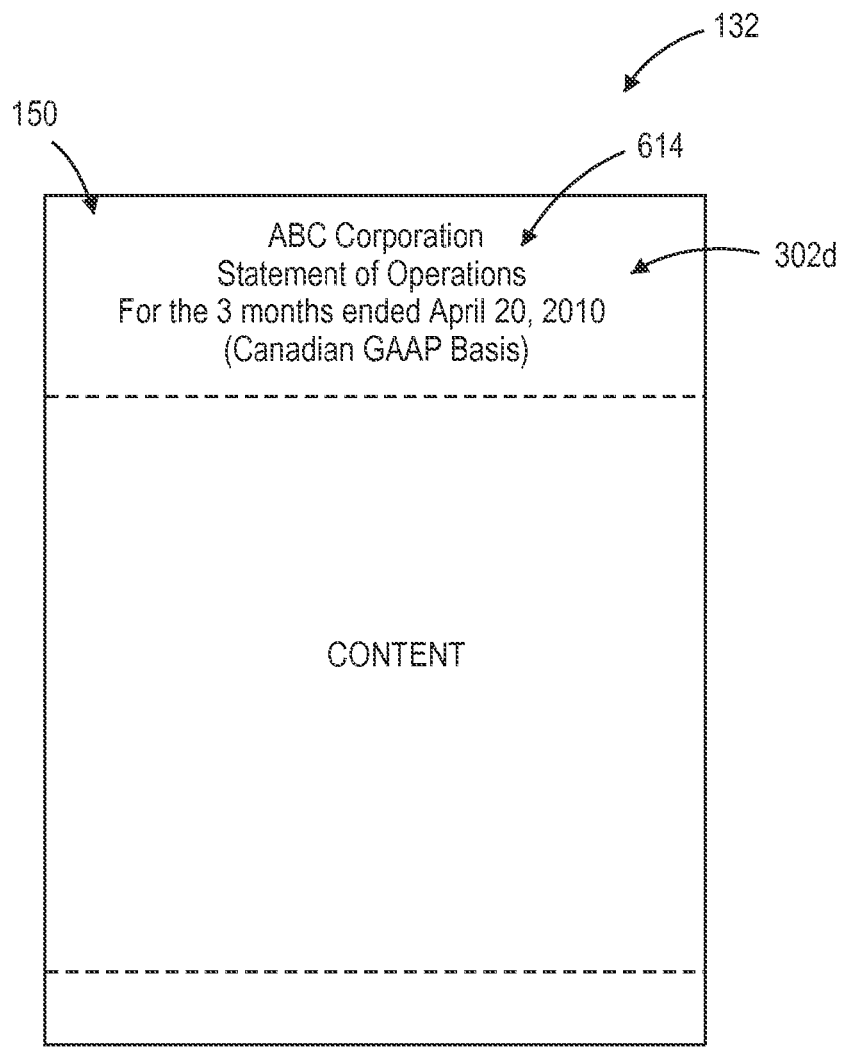
FIG. 10 generally illustrates a determined configuration of a header of a financial statement, and one manner in which a header configured may be incorporated into a financial statement.

At step 908, compare engine 113b generates or populates the header 132b with data received from the one or more sources 610 and according to the determined configuration 302d, as generally illustrated in FIG. 10. According to one embodiment, header 132b is generated automatically by compare engine 113b using the retrieved data and determined configuration 302. In another embodiment, compare engine displays header 132b structured according to the configuration 302 so that end user 135 can enter header data.

Figure 11:
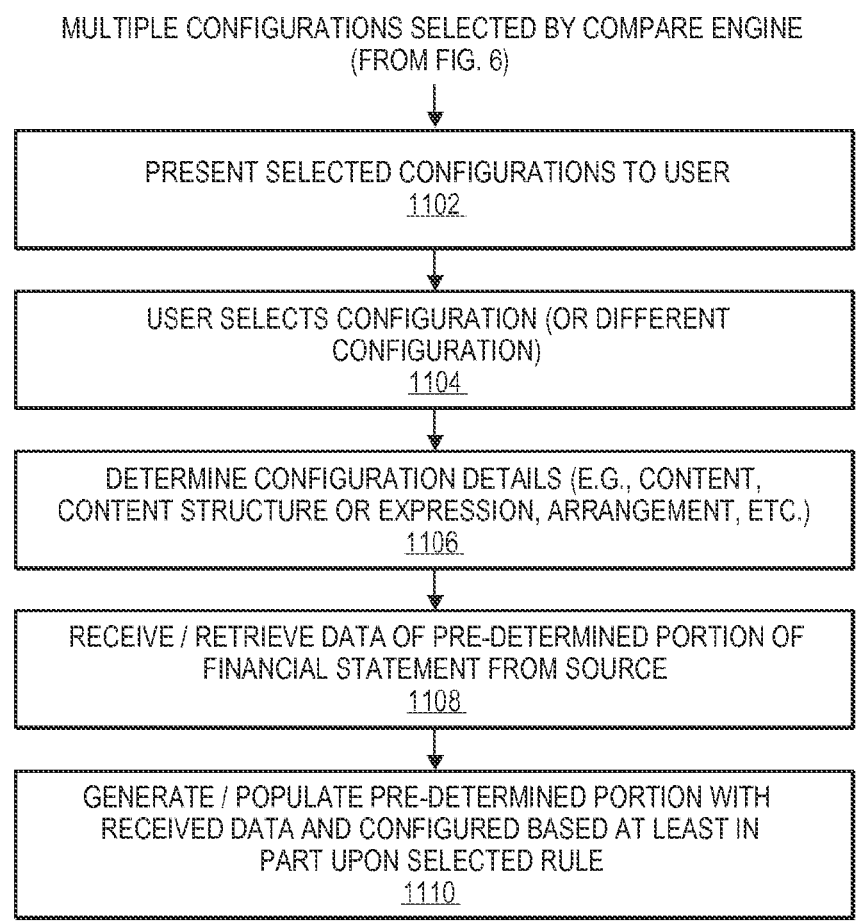
FIG. 11 is a flow diagram of one embodiment of a method for comparing attributes and rules, a rule engine selecting multiple rules, and a preparer selecting a rule to be used for indicating how a pre-determined portion of a financial statement should be configured.

Referring again to FIG. 6, and with further reference to FIG. 11, if compare engine 113b determines that multiple configurations 132d may apply, then at 1102, the compare engine 113b may present the determined configurations 302d and/or related rules 114 to end user 135, who may then select a configuration 132d to be utilized at 1104. If end user 135 does not want to utilize the configuration 302 presented, end user 135 can select a different configuration 302. Having the determined or selected configuration 302d, compare engine 113b then executes steps 1106-1110 and determines configuration details (e.g., content, content structure or expression, arrangement, etc.), receives or retrieves data of attributes 1233 from source(s) 610, and generates or populates header 132b with the data per the configuration 302d selected or confirmed by end user 135.

Rules and resulting configurations 302d utilized to configure headers 132b and other portions 150 of a financial statement may be utilized for initial generation of the header 132b by compare engine 113b and/or for changes to an existing header 132b. For example, when dates of financial statement 132 are changed, compare engine 113b can read determine the content and format of the new date data, compare the new content and format to acceptable date content and formats per the applicable configuration 302. If the new data complies with the configuration 302d, the compare engine 113b can update the header with the updated data. Otherwise, the compare engine 113 can notify user 135 if the data content or format does not satisfy the configuration 302d and/or intelligently adjust the content and/or format per the configuration 302 to satisfy the accounting standard 122. For this purpose, for example, database 118 may store grammatical rules or preferences, and compare engine 113b can compare the changes and make grammatical corrections to the changes if necessary.

Thus, in addition to being able to generate headers 132b that comply with accounting standards 122, embodiments are also able to intelligently or smartly conform changes to the applicable configuration 302d as needed so that the changes to an existing header 132b also comply with the accounting standard 122. Examples in which such intelligent adjustments may occur include changes to a date and adjusting how dates, periods of time or ranges of dates are grammatically expressed, e.g., if certain dates within the content 132a of financial statement are changed, the correct representation of the new date(s) or period of time can be reflected in the header 132b per the applicable configuration 302d. Further, if a user 135 manually changes the header 132b, those manual changes can be analyzed and corrected as necessary by compare engine 113b.

Figure 12:
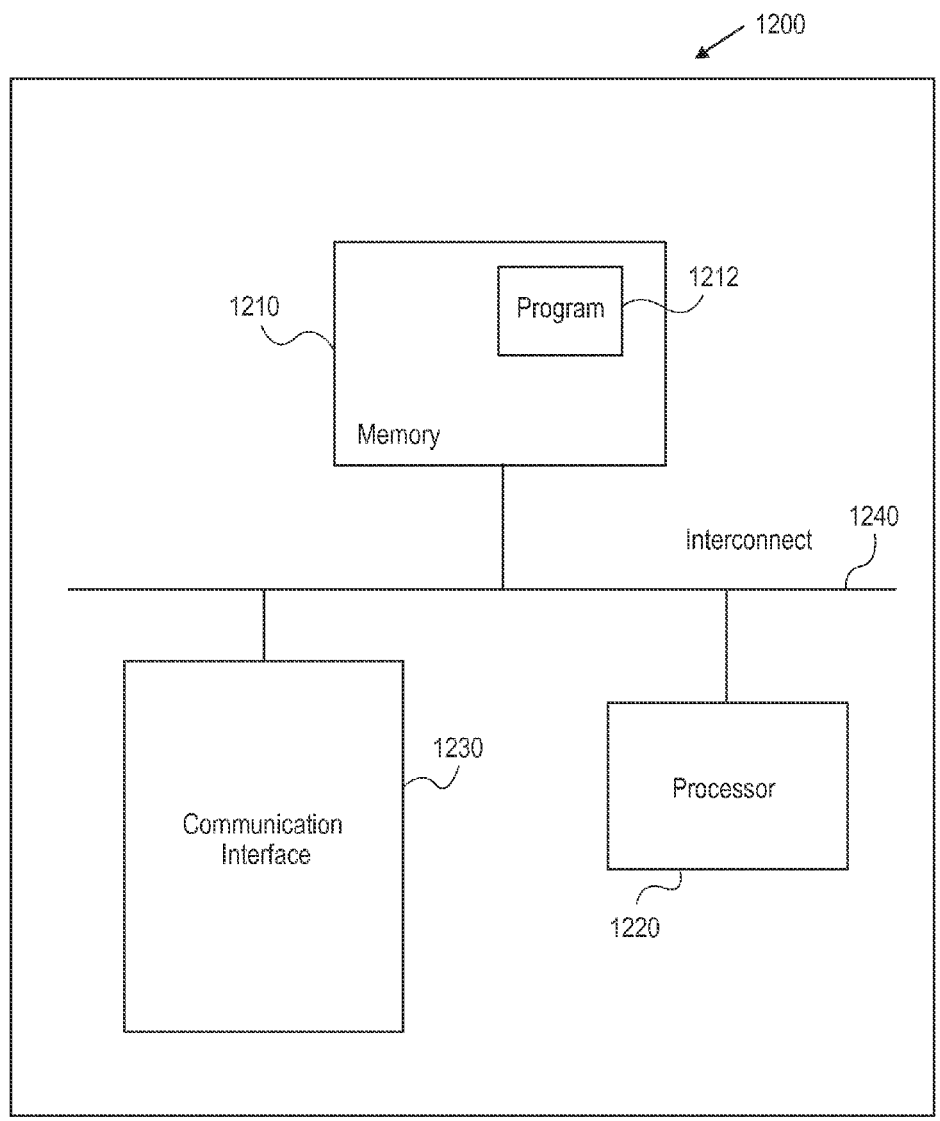
FIG. 12 is a block diagram of components of a computing apparatus or system in which various embodiments may be implemented or that may be utilized to execute embodiments.

FIG. 12 generally illustrates components of a computing device 1200 that may be utilized to execute embodiments and that includes a memory 1210, account processing program instructions 1212, a processor or controller 1220 to execute account processing program instructions 1212, a network or communications interface 1230, e.g., for communications with a network or interconnect 1240 between such components. The memory 1210 may be or include one or more of cache, RAM, ROM, SRAM, DRAM, RDRAM, EEPROM and other types of volatile or non-volatile memory capable of storing data. The processor unit 1220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 1230 may be configured to enable a system component to communicate with other system components across a network which may be a wireless or various other networks. It should be noted that one or more components of computing device 1200 may be located remotely and accessed via a network. Accordingly, the system configuration provided in FIG. 12 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1220 executes program instructions 1212 within memory 1210 and/or embodied on the carrier to implement method embodiments. Further, embodiments may reside and execute on a mobile communication device such as a cellular telephone or Smartphone or tablet computing device.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, embodiments may involve various accounting standards utilized by various countries such that attributes considered may vary.

Further, while certain embodiments are describe with reference to a header content and format being controlled by a determined configuration, embodiments also allow for users to edit, add and/or delete rules and/or configurations associated with rules derived from the accounting standard requirements.

Moreover, while certain embodiments are described with reference to configuring a header of a financial statement, it will be understood that embodiments may also apply to specify content and/or format of other sections of a financial statement that comply with an accounting or other standard.

Further, it will be understood that one or more user interfaces may be utilized to add, delete and/or modify rules, e.g., XML rules, and that one or more user interfaces may be utilized to allow a user to provide inputs of attributes related to a financial statement in the event that attribute data is not retrieved by compare engine from a source such as a ledger or other portion of the financial statement.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for determining how a header or footer of an electronic financial statement that is being prepared should be configured for compliance with an accounting standard, the method comprising:
    before preparation of the electronic financial statement of the entity and on behalf of the entity, a first computer, by a conversion engine, generating respective rules by receiving text of requirements or guidelines of a specific accounting standard and transforming respective text into respective rules, and storing respective generated rules to a database; and
    during preparation of the electronic financial statement of the entity on behalf of the entity, the first computer, by a compare engine, determining, content of at least one pre-determined attribute of the electronic financial statement comprising numerical data describing finances of the entity for which the electronic financial statement is being prepared, accessing the database comprising the plurality of generated rules, comparing the content of the at least one pre-determined attribute and respective criteria of the plurality of rules, selecting a generated rule based at least in part upon the comparison, and
determining a configuration of the header or footer of the electronic financial statement specified by the selected generated rule;
    the first computer receiving data for the header or footer; and
    the first computer automatically populating or generating the header or footer according to the determined configuration with the received data for the header or footer without input of a person preparing the electronic financial statement on behalf of the entity such that the header or footer data and form of the electronic financial statement being prepared comply with the specific accounting standard based at least in part upon the electronic financial statement content.

2. The computer-implemented method of claim 1, transforming respective text of requirements or guidelines comprising transforming respective text of respective requirements or guidelines into respective rules expressed in Extensible Markup Language (XML).

3. The computer-implemented method of claim 1, transforming respective text of requirements or guidelines comprising transforming respective text of respective generated rules into respective rules expressed in Boolean logic.

4. The computer-implemented method of claim 1, the first computer comprising a computer utilized by a preparer of the electronic financial statement.

5. The computer-implemented method of claim 1, the first computer comprising a computer in communication through a first network with a second computer utilized by a preparer of the electronic financial statement, the first computer also being in communication through a second network with a third computer hosting the requirements or guidelines of the accounting standard, wherein the first computer receives the requirements or guidelines of the accounting standard through the second network from the third computer.

6. The computer-implemented method of claim 1, before the header or footer is automatically populated, further comprising the first computer receiving input from a user of the first computer indicating whether the selected generated rule should be utilized for the header or footer.

7. The computer-implemented method of claim 1, before the header or footer is automatically populated, the rule engine selecting a plurality of potentially applicable generated rules, the method further comprising the first computer receiving input from a user indicating which generated rule should be selected.

8. The computer-implemented method of claim 1, the electronic financial statement content quantitatively describing the financial condition of the entity.

9. The computer-implemented method of claim 1, the accounting standard comprising Generally Accepted Accounting Principles (GAAP) or International Financial Reporting Standards (IFRS).

10. The computer-implemented method of claim 1, the method further comprising:
    the first computer determining which accounting standard applies to the electronic financial statement based at least in part upon comparing a geographic location of the entity and respective criteria of the plurality of generated rules.

11. The computer-implemented method of claim 1, the at least one pre-determined attribute of the electronic financial statement comprising at least one of:
    a corporate or organizational structure of the entity,
    a type of business conducted by the entity,
    a type of engagement or service requested by the entity,
    an accounting basis utilized by the entity,
    a type of the electronic financial statement to be prepared for the entity, and
    a number of periods of time or a range of dates for which the electronic financial statement is prepared.

12. The computer-implemented method of claim 1, respective content of a plurality of pre-determined attributes of the electronic financial statement being utilized by the rule engine to select a generated rule.

13. The computer-implemented method of claim 12, the rule engine selecting at least one generated rule based at least in part upon comparing respective content of respective pre-determined attributes of the electronic financial statement and respective criteria of respective generated rules according to a pre-determined attribute sequence or hierarchy.

14. The computer-implemented method of claim 1, the selected generated rule specifying how a date, number of periods of time or range of dates, a name of the entity, and the accounting standard are presented within the header or footer of the electronic financial statement of the entity that is being prepared by the person on behalf of the entity.

15. The computer-implemented method of claim 1, the selected generated rule specifying how a date, number of periods of time or range of dates, a name of the entity, a type of the electronic financial statement, and the accounting standard are presented within the header or footer of the electronic financial statement of the entity that is being prepared by the person on behalf of the entity.

16. The computer-implemented method of claim 1, the electronic financial statement of the entity being prepared by the person on behalf of the entity reflecting activity of the entity that has occurred.

17. The computer-implemented method of claim 16, the electronic financial statement of the entity being prepared by the person on behalf of the entity comprising an electronic income statement indicating that a net loss occurred.

18. The computer-implemented method of claim 1, the electronic financial statement of the entity being prepared by the person on behalf of the entity comprising an electronic quarterly or annual financial statement.

19. The computer-implemented method of claim 1, the first computer receiving data for the header or footer comprising the first computer receiving data comprising data of a ledger or the content of the electronic financial statement of the entity being prepared by the person on behalf of the entity.

20. The computer-implemented method of claim 1, the compare engine executing in response to a user request.

21. The computer-implemented method of claim 1, the compare engine executing in response to determining that the electronic financial statement has been opened or is being prepared.

22. The computer-implemented method of claim 1, transforming respective text of requirements or guidelines comprising transforming respective text of respective generated rules into respective generated rules expressed in a hierarchical structure of a plurality of pre-determined attributes of the electronic financial statement.

23. The method of 1, wherein the conversion engine is automated such that text of the requirements or guidelines of the specific accounting standard are fed into the conversion engine without manual entry by a host of the first computer, and wherein the content of at least one pre-determined attribute of the electronic financial statement is received by the compare engine from an electronic source without requiring the person preparing the electronic financial statement of the entity on behalf of the entity to enter data of the content of the at least one pre-determined attribute.

24. A computer program product comprising a non-transitory computer readable storage medium embodying one or more instructions executable by a computer to perform a process for determining how a header or footer of an electronic financial statement that is being prepared should be configured for compliance with an accounting standard, the process comprising: before preparation of the electronic financial statement of the entity and on behalf of the entity, a first computer, by a conversion engine, generating respective rules by receiving text of requirements or guidelines of a specific accounting standard and transforming respective text into respective rules, and storing respective generated rules to a database; and during preparation of the electronic financial statement of the entity on behalf of the entity, the first computer, by a compare engine, determining content of at least one pre-determined attribute of the electronic financial statement comprising numerical data describing finances of the entity for which the electronic financial statement is being prepared, accessing the database comprising the plurality of generated rules, comparing the content of the at least one pre-determined attribute and respective criteria of the plurality of generated rules, selecting a generated rule based at least in part upon the comparison, determining a configuration of the header or footer of the electronic financial statement specified by the selected generated rule; the first computer receiving data for the header or footer; and the first computer automatically populating or generating the header or footer according to the determined configuration with the received data for the header or footer without input by a person preparing the electronic financial statement on behalf of the entity such that the header or footer data and form comply with the specific accounting standard based at least in part upon the electronic financial statement content.

25. The computer program product of claim 24, transforming respective text of requirements or guidelines comprising transforming respective text of respective requirements or guidelines into respective rules expressed in Extensible Markup Language (XML).

26. The computer program product of claim 24, transforming respective text of requirements or guidelines comprising transforming respective text of respective requirements or guidelines into respective rules expressed in Boolean logic.

27. The computer program product of claim 24, the accounting standard comprising Generally Accepted Accounting Principles (GAAP) or International Financial Reporting Standards (IFRS).

28. The computer program product of claim 24, the process further comprising the first computer
determining which accounting standard applies to the electronic financial statement.

29. The computer program product of claim 24, transforming respective text of requirements or guidelines comprising transforming respective text of respective requirements or guidelines into respective rules expressed in a hierarchical structure of a plurality of pre-determined attributes of the electronic financial statement.

* * * * *